(12) United States Patent
Lambert et al.

(10) Patent No.: US 10,122,933 B2
(45) Date of Patent: Nov. 6, 2018

(54) METHOD AND APPARATUS FOR RECORDING AN IMAGE SEQUENCE OF AN AREA SURROUNDING A VEHICLE

(75) Inventors: Georg Lambert, Wolfsburg (DE); Reiner Katzwinkel, Meine (DE)

(73) Assignee: VOLKSWAGEN AG, Wolfsburg (DE)

( * ) Notice: Subject to any disclaimer, the term of this patent is extended or adjusted under 35 U.S.C. 154(b) by 1112 days.

(21) Appl. No.: 13/163,213

(22) Filed: Jun. 17, 2011

(65) Prior Publication Data

US 2011/0310249 A1   Dec. 22, 2011

(30) Foreign Application Priority Data

Jun. 19, 2010 (DE) .................. 10 2010 024 415

(51) Int. Cl.
| | |
|---|---|
| *H04N 7/18* | (2006.01) |
| *H04N 5/235* | (2006.01) |
| *H04N 5/238* | (2006.01) |
| *H04N 5/353* | (2011.01) |

(52) U.S. Cl.
CPC ............ *H04N 5/235* (2013.01); *H04N 5/238* (2013.01); *H04N 5/353* (2013.01)

(58) Field of Classification Search
CPC ............... B60R 1/00; B60R 2300/105; B60R 2300/802; B60R 11/04; H04N 7/181; H04N 5/235; H04N 5/238; H04N 5/353
USPC ........................................ 348/148, 149, 159
See application file for complete search history.

(56) References Cited

U.S. PATENT DOCUMENTS

| | | | |
|---|---|---|---|
| 7,567,291 B2 | 7/2009 | Bechtel et al. | |
| 2003/0043280 A1* | 3/2003 | Nagao et al. | 348/216.1 |
| 2003/0103141 A1* | 6/2003 | Bechtel et al. | 348/148 |
| 2003/0142745 A1* | 7/2003 | Osawa | 375/240.03 |
| 2006/0017656 A1* | 1/2006 | Miyahara | 345/8 |
| 2006/0202038 A1* | 9/2006 | Wang | G06K 7/10732 235/462.24 |
| 2007/0253695 A1* | 11/2007 | Miyazawa et al. | 396/234 |
| 2008/0205705 A1* | 8/2008 | Kashimura et al. | 382/104 |
| 2008/0309517 A1* | 12/2008 | Saito | 340/937 |
| 2009/0262192 A1* | 10/2009 | Schofield et al. | 348/148 |
| 2010/0026868 A1* | 2/2010 | Pertsel | H04N 5/374 348/308 |

FOREIGN PATENT DOCUMENTS

| | | |
|---|---|---|
| DE | 19640022 C1 | 4/1998 |
| DE | 19805000 A1 | 8/1999 |
| DE | 10245085 A1 | 4/2004 |
| DE | 10338490 A1 | 3/2005 |
| DE | 102005036083 A1 | 3/2006 |
| DE | 60308242 T2 | 8/2007 |
| DE | 102006055905 A1 | 5/2008 |

(Continued)

OTHER PUBLICATIONS

Search Report for German Patent Application No. 10 2010 024 415.5; dated Apr. 4, 2011.

*Primary Examiner* — On S Mung

(74) *Attorney, Agent, or Firm* — Barnes & Thornburg LLP

(57) ABSTRACT

Optical radiation from an area surrounding a vehicle is detected by a sensor in order to record an image sequence of the surrounding area. The sensor may be exposed continuously to the radiation which is incident on it while the image sequence is being recorded in order to detect a light pulse of an indefinitely short time duration.

12 Claims, 2 Drawing Sheets

(56) References Cited

FOREIGN PATENT DOCUMENTS

| | | |
|---|---|---|
| DE | 102008022064 A1 | 11/2009 |
| EP | 1291243 A2 | 3/2003 |
| JP | 11028977 A | 2/1999 |

* cited by examiner

METHOD AND APPARATUS FOR RECORDING AN IMAGE SEQUENCE OF AN AREA SURROUNDING A VEHICLE

PRIORITY CLAIM

This patent application claims priority to German Patent Application No. DE 10 2010 024 415.5, filed Jun. 19, 2010, the disclosure of which is incorporated herein by reference in its entirety.

FIELD

Disclosed embodiments relate to a method and an apparatus for recording an image sequence of an area surrounding a vehicle, and to a correspondingly designed vehicle, which uses the disclosed embodiments, for example, for an electronic rear-view mirror.

BACKGROUND

The recording of an image sequence of the area surrounding a vehicle is known for driver assistance systems (see for example DE 10 2006 055 905 A1, DE 10 2008 022 064 A1), or else as a replacement for a rear-view mirror (see U.S. Pat. No. 7,567,291 B2).

In order to allow the image sequence to be recorded both during the daytime and at night with adequate quality, wide brightness ranges must be covered. For example, if an imaging sensor is used as a vehicle rear-view mirror, the brightness which is incident on it must be regulated. According to the prior art, this is done by electronic exposure time control in the digital camera. The time duration in which the image is recorded can therefore be considerably shorter when the surrounding area is bright than the cycle time for image transmission. Nevertheless, pulsed light sources which emit their light in the form of short light pulses must be identifiable in the recorded image sequence in order, for example, to also identify flashing LED lights of modern emergency vehicles, in addition to rotating warning lights on older emergency vehicles (for example the blue light on a police vehicle) as such in the image sequence.

SUMMARY

Disclosed embodiments record an image sequence of an area surrounding a vehicle, with even light pulses of virtually any desired short time duration being contained with appropriate quality in the recorded image sequence.

This may be achieved by a method for recording an image sequence of an area surrounding a vehicle in accordance with the disclosed embodiments, by an apparatus for recording an image sequence of an area surrounding a vehicle as disclosed herein, by a vehicle and by use of an apparatus according to the disclosed embodiments.

BRIEF DESCRIPTION OF THE FIGURES

The inventive concept will be described in detail in the following text using disclosed embodiments and with reference to the figures.

DETAILED DESCRIPTION

Figure 1:
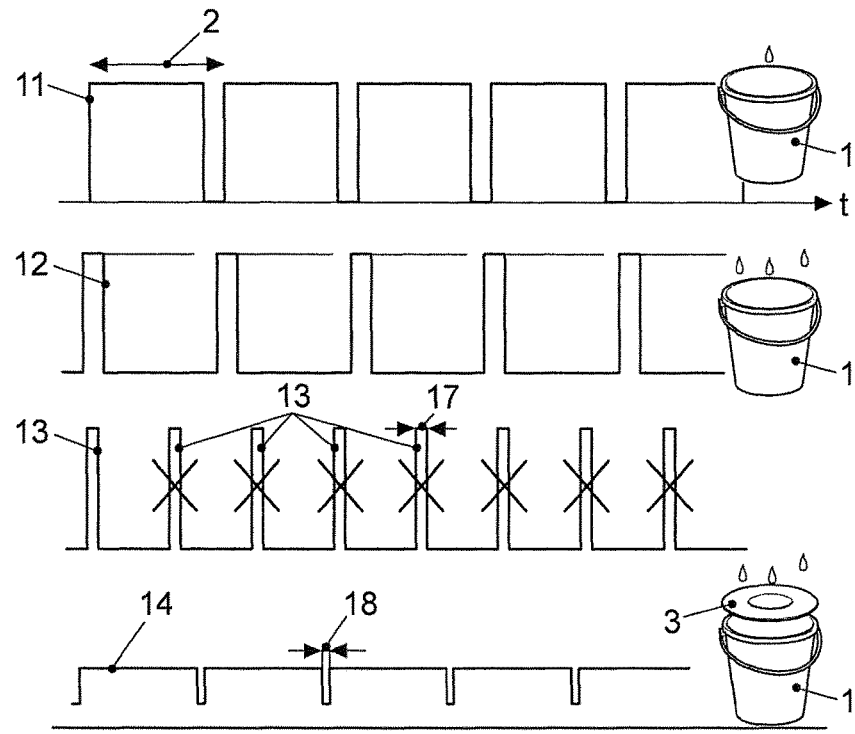
FIG. 1 illustrates the one example of the disclosed embodiments in comparison to the prior art.

A method for recording an image sequence of an area surrounding a vehicle is provided within the scope of the disclosed embodiments. In this case light or optical radiation from the surrounding area is detected by a sensor, in order to record the image sequence. This sensor is exposed continuously to the radiation which is incident on it from the surrounding area while the image sequence is being recorded, in order to detect even a light pulse with an indefinitely short time duration.

According to the prior art, electronic exposure time control is generally used for matching to a brightness of the radiation which is incident on the sensor. In this case, the exposure time, that is to say the time duration in which the sensor detects the optical radiation from the surrounding area and in which the sensor is sensitive to light, is considerably shorter when the surrounding area is bright than a cycle time for image transmission. In this case, the cycle time results from the framing rate, that is to say the number of images which the sensor records per second (the product of the cycle time and the framing rate is in this case one second). According to the prior art, when the surrounding area is bright, an exposure time of 1 ms is, for example, normal for a normal cycle time of 30 ms, which means that the sensor is effectively blind for 29 ms in each cycle, and will not detect optical radiation from the surrounding area.

In contrast, the sensor according to the disclosed embodiments detects the radiation which is incident on it from the surrounding area all the time or continuously, such that its exposure time is set to the maximum. The method according to the disclosed embodiments is therefore also able to detect light from pulsed light sources, such as, for example, a blue light of a vehicle, as such. Therefore, while it is highly probable according to the prior art that the time duration in which a pulsed light source emits light falls within a pause time of the sensor (that is to say within a time in which the sensor is not actively recording light), in which this is not sensitive to light, this is not possible according to the disclosed embodiments. Therefore, according to disclosed embodiments, the sensor also detects light from modern LED headlights or LED rear lights, which likewise emit light in a pulsed form.

For the purposes of the disclosed embodiments, the term sensor covers both a sensor which detects a complete image and a sensor which detects only a part of an image (for example one pixel of the image). In the second case, a plurality of sensors are used according to the disclosed embodiments in order to record the image sequence.

For the purposes of the disclosed embodiments, an image sequence means a sequence of images. The time interval between two successive images will in this case be chosen in particular such that the viewer identifies a recorded smooth movement as such, as is the case with a time interval of about 30 ms. In order, for example, to avoid saturation of the sensor, an amount of light from the radiation which is incident on the sensor can be regulated (for example damped) such that the amount of light per unit time is kept below a predetermined threshold value.

If the sensor, for example a CMOS sensor, has an adequate basic sensitivity and a suitable HDR mode ("High Dynamic Range"), regulation (damping) of the amount of light which is incident on the sensor can be dispensed with, since a sensor such as this is able to identify even pulsed light sources at any time, independently of the brightness of the surrounding area. However, a commercially available sensor generally does not have these characteristics, as a result of which it is advantageous when using a commercially available sensor to keep the amount of light per unit time below the predetermined threshold value, in order to prevent the sensor from being saturated or overexposed.

A pause time is defined for the sensor such that the sensor does not convert the radiation which is incident on it in this pause time to electrical signals, or is not sensitive to light. A pause time such as this is advantageously set such that the pause time is shorter than a predetermined time duration. In this case, the predetermined time duration corresponds to that time duration in which a predetermined light pulse which is still intended to be just detected by the sensor while recording the image sequence emits its light. The sensor can be read in the pause time, in order to detect and to evaluate the charge which corresponds to the respective image (frame), which was produced by the sensor during the exposure time, depending on the amount of light which is incident during this time. Pause times of less than 5 µs are possible with commercially available sensors.

If this pause time is shorter than that time duration in which the light pulse to be detected emits its light, this ensures that the sensor detects the light pulse even when the pause time actually coincides with this time duration. In other words, the sensor always detects the light pulse.

The following options are feasible according to the invention in order to ensure that the sensor is not overexposed, and that the sensor therefore does not become saturated.

The radiation which is incident on the sensor can be damped by a damping filter such that it is impossible for the sensor to be overloaded or overexposed. A damping filter, for example an electronic damping filter, such as this, which is also referred to as a photochromatic or electrochromatic lens, is arranged in front of the sensor such that any optical radiation from the surrounding area which is incident on the sensor first of all passes through the damping filter. In the case of a photochromatic lens, the transmission characteristics (that is to say the light transmissivity characteristics) of the lens are controlled by the incident light, and in the case of the electrochromatic lens, this is done by application of a voltage. In both cases, the transmission characteristics of the damping filter are set such that the damping filter passes on to the sensor a lesser component of the incident radiation the greater the amount of light per unit time of the radiation which is incident on the damping filter. In other words, an incident bright light is damped by means of the damping filter such that the sensor is not overloaded, even if it is exposed continuously. The damping filter is appropriately adapted when it is dark, such that even pulsed light sources are identified.

The amount of light which is incident on the sensor as a result of the optical radiation from the surrounding area can also be controlled by means of a variable aperture, depending on the brightness conditions in the surrounding area, such that the sensor is not overloaded or overexposed. For this purpose, the variable aperture (in the same way as the damping filter) is arranged in front of the sensor such that any radiation which is incident on the sensor from the surrounding area first of all passes through the variable-aperture opening. For control purposes, the variable-aperture opening of the variable aperture, which is also referred to as an objective variable aperture or auto-iris, is automatically controlled such that the amount of light which is incident on the sensor per unit time nevertheless does not exceed the predetermined threshold value in different lighting conditions in the surrounding area. The variable aperture reduces the amount of light which is incident on the sensor by cutting off the beam path from the edge. The variable aperture is used for mechanical regulation of the exposure of the sensor. Any brightness which may occur is regulated down by the use of the variable aperture, which is arranged in the optical path in front of the sensor, such that the exposure time of the sensor is always of maximum length. The sensor therefore detects even light flashes of short time duration.

According to the invention, a combination of a damping filter and variable aperture is also possible, such that the light which is incident on the sensor first of all passes through the damping filter and the variable aperture (or vice versa), before arriving at the sensor.

Since the damping filter and/or the variable aperture prevents overloading of the sensor, the exposure time of the sensor can advantageously be set to the maximum independently of the surrounding-area light conditions, as a result of which the sensor is exposed continuously to the radiation which is incident on it while recording the image sequence, in order in this way to detect a light pulse of an indefinitely short time duration.

An apparatus for recording an image sequence of an area surrounding a vehicle is also provided within the scope of the disclosed embodiments. In this case, the apparatus comprises a controller and a light-sensitive sensor. The sensor detects optical radiation from the surrounding area, in order to record the image sequence or sequence of images. The apparatus is designed such that the sensor is exposed all the time to the radiation which is incident on it while the image sequence is being recorded.

In this case, the apparatus may also comprise a damping filter. This damping filter is arranged with respect to the sensor such that any optical radiation which is incident on the sensor first of all passes through the damping filter. The controller operates the damping filter depending on a light intensity of the radiation from the surrounding area such that the damping filter damps the radiation which is incident on the sensor such that the sensor is not overloaded, saturated or overexposed. When a photochromatic lens is used as the damping filter, the controller for the apparatus can also be at least partially integrated in the lens, thus allowing the transmission characteristic of the lens or of the damping filter to be set depending on the light which is incident on the lens.

In addition to or instead of the damping filter, the apparatus may also comprise a variable aperture. In this case, the variable aperture is arranged with respect to the sensor such that any light which is incident on the sensor first of all passes through the variable aperture. The controller for the apparatus controls the variable aperture depending on the brightness conditions of the radiation from the surrounding area, such that the radiation which is incident on the sensor from the variable aperture does not lead to the sensor being overloaded. When using a regulated objective variable aperture, variable aperture steps of the objective variable aperture can be controlled depending on the incident light such that the sensor can be exposed continuously without being overloaded when it is bright. Even pulsed light can therefore be detected by the sensor at any time.

The advantages of the apparatus according to the invention correspond essentially to the advantages of the method according to the invention, which have been described above in detail, and will therefore not be repeated here.

Finally, a vehicle which comprises an apparatus according to the invention is also provided within the scope of the disclosed embodiments.

In one disclosed embodiment, this vehicle comprises a monitor, on which the image sequence recorded by means of the sensor is reproduced.

A monitor such as this or an image display such as this can in this case replace a rear-view mirror (external mirror or internal mirror) on the vehicle. In other words, the apparatus according to the invention or the method according to the invention can be used for a digital external mirror or for a digital internal mirror in a vehicle.

The disclosed embodiments are particularly suitable for reproducing an image sequence, which has been recorded from the area surrounding a vehicle, on a monitor within the vehicle. Furthermore, the disclosed embodiments can be used for camera-based driver assistance systems, for example for identification of pulsed LED rear lights and braking lights of vehicles travelling in front. According to the invention, it is also possible to identify pulsed LED light from a daytime driving light or from front headlights of an approaching vehicle when using a lane change assistant (for example for warning of overtaking traffic). The disclosed embodiments are, of course, not restricted to these particular application fields, since the disclosed embodiments can also be used for marine vessels, aircraft or track-bound or rail vehicles. Furthermore, the disclosed embodiments can also be used with a fixed-position monitor, in order to reproduce an image sequence of any desired surrounding area on this monitor.

Turning to the figures' illustration of the features described above, the top of FIG. 1 illustrates the exposure intervals 11 in darkness. As can be seen, the exposure time (that is to say the time duration per image in which the sensor is sensitive to light) makes up a large proportion of a period duration 2, in which an image is in each case recorded by a light-sensitive sensor 1, which is illustrated as a bucket. Because it is dark, the amount of light which is incident on the sensor 1 is low, and this is represented in the form of a water droplet above the bucket (sensor 1). Because of the relatively long exposure time, the sensor 1 is exposed virtually continuously according to the prior art when it is dark.

A profile of exposure intervals 12 in the case of a bright surrounding area is illustrated below the profile of the exposure intervals 11. As can be seen, in this case, the exposure time makes up only a small percentage of the period duration 2. Because of the brightness, the amount of light which is incident on the sensor 1 (in comparison to when it is dark) is large, and this is represented in the form of a plurality of water droplets above the bucket. Because of the relatively short exposure time, the sensor 1 is exposed for only a short time according to the prior art when it is bright, as a result of which only a fraction of the amount of light is converted to electrical signals.

Light intervals 13 of a pulsed light source are illustrated under the profile of the exposure intervals 12 when it is bright. The light intervals 13 in this case have a time duration as indicated by the reference symbol 17. In the case of the constellation illustrated in FIG. 1, only the first light pulse 13 falls within the exposure time 12, while the other (crossed-through) light pulses 13 do not fall within an exposure time 12, and are therefore not detected by the sensor 1 according to the prior art.

According to the invention, a variable aperture 3 is arranged above the sensor 1. This variable aperture 3 ensures that the exposure time can be set to the maximum despite the brightness, without risk of overexposing the sensor 1, since the variable aperture 3 allows only a specific proportion of the amount of light to pass through to the sensor 1. If a pause time 18, in which the sensor does not convert the amount of light which is incident on it to electrical signals, is shorter than the time duration 17 in which the pulsed light source emits light, this ensures that the sensor 1 according to the invention detects every light pulse 13.

In order to solve the problem of detecting every light pulse 13, longer exposure intervals 14 are therefore used according to the invention, with the light density or light power being reduced by the variable aperture 3.

Figure 2:
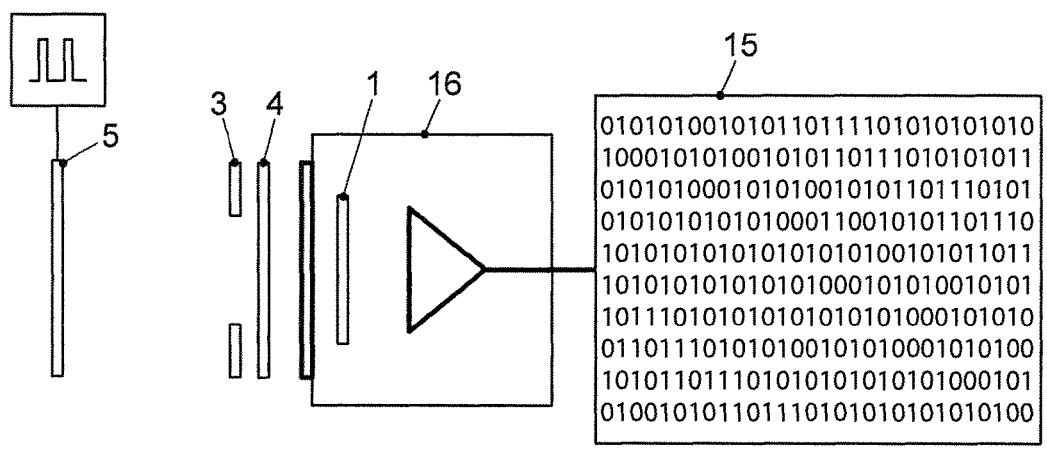
FIG. 2 shows an outline use according to the disclosed embodiments of a light-sensitive sensor 1, FIG. 3 schematically shows a vehicle according to the disclosed embodiments with an apparatus according to the disclosed embodiments.

FIG. 2 shows a camera 16 with a light-sensitive sensor 1 for recording light pulses from a regulated pulsed light source 5, according to the disclosed embodiments. A variable aperture 3 and a damping filter 4 are arranged in front of the camera 16, in order to restrict an amount of light which is incident on the sensor 1 to a predetermined threshold value, independently of the brightness conditions in the surrounding area. It is thus possible for the sensor 1 to be exposed virtually all the time to the radiation which is incident on it, in order in this way to detect even light pulses of indefinitely short time duration from the regulated pulsed light source 5, and to pass them on in the form of electrical signals to a corresponding evaluation apparatus 15.

Figure 3:
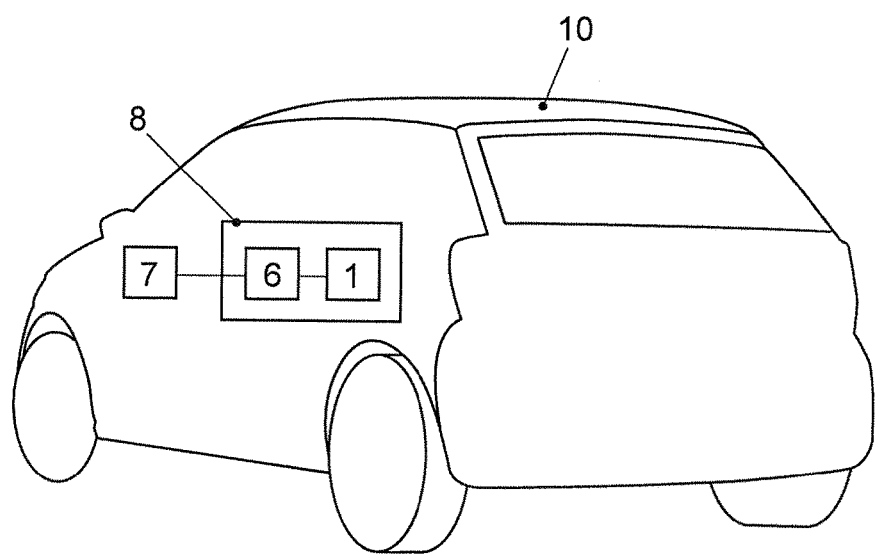

FIG. 3 shows a vehicle according to the invention, which comprises an apparatus 8 according to the invention and a monitor 7. The apparatus 8 itself comprises a light-sensitive sensor 1 and a controller 6. The controller 6 passes on to the monitor 7 the image sequence recorded with the aid of the light-sensitive sensor 1. When an image sequence from the area surrounding the rear of vehicle 10 is being recorded by the sensor 1, the monitor 7 can replace a rear-view mirror on the vehicle 10.

The invention claimed is:

1. A method for recording an image sequence of an area surrounding a vehicle, the method comprising:
   detecting optical radiation from the surrounding area by a sensor to record the image sequence;
   regulating an amount of light from the radiation which is incident on the sensor such that the amount of light per unit time on the sensor is kept below a predetermined threshold value during the recording of the image sequence, wherein the regulating of the amount of light incident on the sensor to the predetermined threshold value is performed independently of the brightness conditions in the surrounding area; and
   continuously exposing the sensor to the optical radiation which is incident on the sensor during an entire cycle time while recording the image sequence,
   wherein the detection, regulation and continuous exposure are performed simultaneously and the regulating of the amount of light incident on the sensor prevents overloading of the sensor, thereby enabling exposure time of the sensor to be set to a maximum value independently of the brightness conditions in the surrounding area, and a pause time of the sensor to be set shorter than a predetermined time duration which corresponds to a predetermined light pulse duration of a light pulse that is to be detected by the sensor.

2. The method of claim 1, further comprising setting an exposure time, in which the sensor converts the radiation which is incident on the sensor to electrical signals, independently of a light intensity of the radiation from the surrounding area.

3. The method of claim 1, further comprising damping the radiation which is incident on the sensor by a damping filter depending on a light intensity of the radiation from the surrounding area such that the sensor is not overloaded.

4. The method of claim 1, further comprising controlling an amount of light of the radiation which is incident on the sensor by a variable aperture depending on a light intensity of the radiation from the surrounding area such that the sensor is not overloaded.

5. An apparatus configured to record an image sequence of an area surrounding a vehicle, the apparatus comprising:
a controller; and
a sensor coupled to the controller and configured to detect optical radiation from the surrounding area to record the image sequence, wherein the controller is configured to regulate an amount of light from the radiation which is incident on the sensor such that the amount of light per unit time on the sensor is kept below a predetermined threshold value during the recording of the image sequence, and wherein the sensor is exposed continuously to the radiation which is incident on the sensor during an entire cycle time while the image sequence is being recorded,
wherein the detection, regulation and continuous exposure are performed simultaneously, wherein the regulating of the amount of light incident on the sensor to the predetermined threshold value is performed independently of the brightness conditions in the surrounding area; and
wherein the regulating of the amount of light incident on the sensor prevents overloading of the sensor, thereby enabling exposure time of the sensor to be set to a maximum value independently of the brightness conditions in the surrounding area, and a pause time of the sensor to be set shorter than a predetermined time duration which corresponds to a predetermined light pulse duration of a light pulse that is to be detected by the sensor.

6. The apparatus of claim 5 further comprising a damping filter arranged with respect to the sensor such that the optical radiation from the surrounding area is incident on the sensor through the damping filter, and wherein the controller is configured to control operation of the damping filter depending on a light intensity of the radiation from the surrounding area such that the damping filter dampens the radiation which is incident on the sensor such that the sensor is not overloaded.

7. The apparatus of claim 5 further comprising a variable aperture arranged with respect to the sensor such that the optical radiation from the surrounding area is incident on the sensor through the variable aperture, and wherein the controller is configured to control operation of the variable aperture depending on a light intensity of the radiation from the surrounding area, such that the variable aperture controls an amount of light of the radiation which is incident on the sensor such that the sensor is not overloaded.

8. The apparatus of claim 5, wherein the apparatus is configured to: detect optical radiation from the surrounding area by the sensor to record the image sequence; and continuously expose the sensor to the optical radiation which is incident on the sensor while recording the image sequence to detect a light pulse of an indefinitely short time duration.

9. A vehicle including an apparatus configured to record an image sequence of an area surrounding the vehicle, the apparatus comprising:
a controller; and
a sensor coupled to the controller and configured to detect optical radiation from the surrounding area to record the image sequence, wherein the controller is configured to regulate an amount of light from the radiation which is incident on the sensor such that the amount of light per unit time on the sensor is kept below a predetermined threshold value during the recording of the image sequence, and wherein the sensor is exposed continuously to the radiation which is incident on the sensor during an entire cycle time while the image sequence is being recorded,
wherein the detection, regulation and continuous exposure are performed simultaneously wherein the regulating of the amount of light incident on the sensor to the predetermined threshold value is performed independently of the brightness conditions in the surrounding area; and
wherein the regulating of the amount of light incident on the sensor prevents overloading of the sensor, thereby enabling exposure time of the sensor to be set to a maximum value independently of the brightness conditions in the surrounding area, and a pause time of the sensor to be set shorter than a predetermined time duration which corresponds to a predetermined light pulse duration of a light pulse that is to be detected by the sensor.

10. The vehicle of claim 9, wherein the vehicle further comprises a monitor on which the recorded image sequence is reproduced.

11. The apparatus of claim 5 included in a digital external mirror in a vehicle.

12. The apparatus of claim 8 included in a digital external mirror in a vehicle.

* * * * *